United States Patent [19]
Kono et al.

[11] Patent Number: 5,403,558
[45] Date of Patent: Apr. 4, 1995

[54] HEAT AND FATIGUE RESISTANT METALLIC CARRIER FOR AUTOMOBILE EXHAUST GAS-PURIFYING CATALYST

[75] Inventors: Takuo Kono, Tokyo; Mikio Yamanaka, Sagamihara; Takashi Tanaka, Sagamihara; Yasushi Ishikawa, Sagamihara; Yutaka Sadano, Kimitsu; Masao Yashiro, Tokai; Tatuo Sugiura, Tokai; Tadanobu Komai, Tokai; Shinichi Matsumoto, Toyota; Toshihiro Takada, Toyota; Shinji Shibata, Toyota; Hikaru Aoyagi, Toyota; Masaaki Ohashi, Toyota; Yoshio Nishizawa; Akihiko Kasahara, both of Tokyo, all of Japan

[73] Assignees: Nippon Steel Corporation, Tokyo; Toyota Jidosha Kabushiki Kaisha, Aichi; Nippon Kinzoku Co., Ltd., Tokyo, all of Japan

[21] Appl. No.: 86,376
[22] Filed: Jul. 6, 1993

Related U.S. Application Data

[63] Continuation of Ser. No. 476,440, Jun. 27, 1990, abandoned.

[30] Foreign Application Priority Data

Oct. 4, 1988 [JP] Japan ................. 63-248994
Apr. 14, 1989 [JP] Japan ................. 1-94345
Apr. 28, 1989 [JP] Japan ................. 1-110610

[51] Int. Cl.⁶ ........................ F01N 3/15
[52] U.S. Cl. ........................ 422/179; 422/180; 422/221; 422/222; 55/DIG. 30; 60/299
[58] Field of Search .......... 422/179, 180, 221, 222; 55/DIG. 30; 60/299

[56] References Cited

U.S. PATENT DOCUMENTS

| | | | |
|---|---|---|---|
| 3,876,384 | 4/1975 | Santiago et al. | 422/179 |
| 4,186,172 | 1/1980 | Scholz | 422/180 |
| 4,282,186 | 8/1981 | Nonnenmann et al. | 422/180 |
| 4,381,590 | 5/1983 | Nonnenmann et al. | 29/157 R |
| 4,521,947 | 6/1985 | Nonnenmann et al. | 29/157 R |
| 4,777,158 | 10/1988 | Cyron | 502/439 |
| 4,795,615 | 1/1989 | Cyron et al. | 422/179 |
| 4,832,998 | 5/1989 | Cyron | 428/116 |
| 4,948,353 | 8/1990 | Maus et al. | 422/180 |

FOREIGN PATENT DOCUMENTS

| | | |
|---|---|---|
| 0263324 | 9/1987 | European Pat. Off. |
| 60-27807 | 7/1985 | Japan |
| 61-199574 | 9/1986 | Japan |
| 62-45345 | 2/1987 | Japan |
| 62-83044 | 4/1987 | Japan |
| 62-160728 | 10/1987 | Japan |
| 62-273050 | 11/1987 | Japan |
| 62-273051 | 11/1987 | Japan |
| 62-194436 | 12/1987 | Japan |
| 63-185627 | 8/1988 | Japan |

OTHER PUBLICATIONS

"Development of Improved Metal-Supported Catalyst" by Nishizawa et al.
SAE Technical Paper Series 890188, Feb. 27-Mar. 3, 1989 "The Development and Application of a Metal Supported Catalyst for Porche's 911 Carrera 4", by Pelters, et al.
SAE Technical Paper Series 890488, Feb. 27-Mar. 3, 1988 "Numerical Simulation and Experimental Verification of Conversion and Thermal Responses for a Pt/Rh Metal Monolithic Converter", by Chen et al.
SAE Technical Paper Series 890798, Feb. 27-Mar. 3, 1989.

Primary Examiner—James C. Housel
Assistant Examiner—Rachel Heather Freed
Attorney, Agent, or Firm—Wenderoth, Lind & Ponack

[57] ABSTRACT

A metallic carrier composed of an end face portion formed in at least one of the axial end portions of a honeycomb body and an outer circumferential reinforcing layer in which foils in a range from the outermost layer to a quarter of the total number of layers are joined together in the axial intermediate portion. Thus, the metallic carrier is flexible in expansion and shrinkage. Further, the honeycomb body and a jacket are joined to each other mainly at the outer circumference of the outer circumferential reinforcing layer of the honeycomb body, to reduce thermal stress developed between the honeycomb body and jacket while maintaining the strength against a high temperature, to thereby prevent the metallic carrier from being ruptured.

19 Claims, 9 Drawing Sheets

FIG. 1 (PRIOR ART)
FIG. 2 (PRIOR ART)
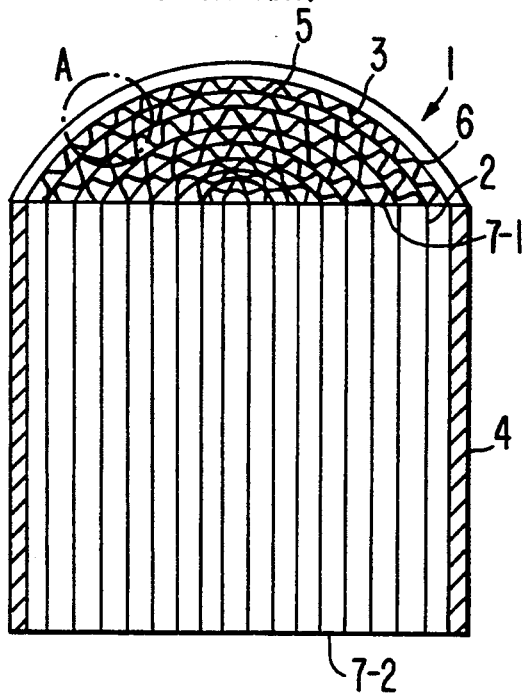
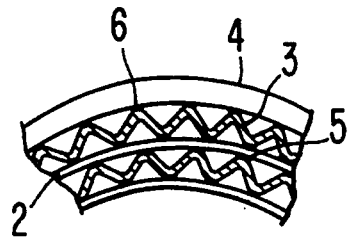
FIG. 3
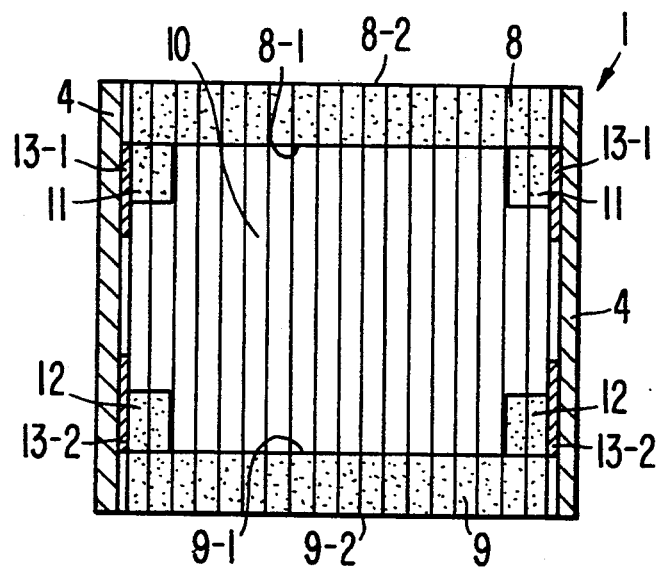

HEAT AND FATIGUE RESISTANT METALLIC CARRIER FOR AUTOMOBILE EXHAUST GAS-PURIFYING CATALYST

This application is a continuation of now abandoned application, Ser. No. 07/476,440, filed on Jun. 27, 1990, now abandoned.

TECHNICAL FIELD

The present invention relates to a metallic carrier for a catalyst which, upon coming into contact with an exhaust gas containing $NO_X^-$, HC, CO, etc., purifies the gas by a catalytic conversion, and more particularly, to a metallic carrier to be provided in the exhaust system of an automotive engine and having a structure in which the catalyst is supported so as to be able to perform its function to the fullest extent, and having a sufficient rigidity against the pressure of hot exhaust gas and the vibration of the engine and a sufficient heat and fatigue resistance against violent temperature variations.

BACKGROUND ART

More than 10 years have passed since the regulation of automotive exhaust gases was put into effect, and now exhaust gases are regulated based on improvements to the engine and the catalytic conversion. The majority of currently available catalysts for the purification of exhaust gases have a structure in which a gamma-alumina powder is supported, and which carriers a precious metal such as Pt on a ceramic honeycomb such as CORDIOLITE. This ceramic honeycomb has a relatively high resistance to the exhaust gas and a limited thermal resistance of the stainless steel mesh buffer inserted between the honeycomb and the jacket for preventing rupture of the honeycomb, and thus the honeycomb must be operated at a relatively low temperature.

Currently, metallic carriers made of stainless steel foils and capable of overcoming the above-mentioned drawback of the conventional catalyst carriers have been proposed and have attracted attention in the industries concerned. Generally, the metallic carriers are composed of a honeycomb formed by laminating or winding a flat metal foil (flat foil) and a corrugated metal foil (corrugated foil), and metallic jacket which houses the honeycomb. Of course, they must have a thermal resistance sufficient to withstand high temperature and high speed exhaust gases in a reaction, and a heat and fatigue resistance making them durable against severe heating and cooling conditions.

For a metallic carrier capable of withstanding the hot and high speed exhaust gases, effectively stainless steel foils having a superior oxidation resistance are used and increased a mutual joining area, but the metallic carrier of only this structure cannot withstand severe cooling and heating. Namely, in the metallic carrier mounted in the exhaust system of an automobile, the honeycomb is heated before the jacket during start up and acceleration. In the case of an engine system in which the engine brake is applied for deceleration and the fuel supply is stopped, the honeycomb is cooled before the outer cylinder, and thus a large difference in temperature between the jacket and honeycomb occurs together with the temperature distribution in the honeycomb. The temperature difference is different during acceleration than during deceleration, and generally, since the honeycomb is made of a material having a thermal expansion coefficient different to that of the material used for the jacket, a large thermal stress occurs in the vicinity of the outer circumference of the honeycomb. Accordingly, the honeycomb is ruptured at the portion thereof near the jacket, and thus the honeycomb is moved away to the downwind side of the exhaust gas flow by the back pressure thereof.

To overcome the drawbacks of the conventional metallic carriers in which all the foils are securely joined together, methods of mechanically fixing of the honeycomb are known from U.S. Pat. No. 4,186,172 and Japanese Examined Patent Publication (Kokoku) No. 60-27807, etc. Further, methods of a partial joining of the honeycomb are known from Japanese Unexamined Patent Publication (Kokai) Nos. 62-45345 and 61-199574. These publications do not definitely disclosed methods of joining the honeycomb and jacket to each other. As disclosed in, for example, Japanese Unexamined Patent Publication No. 61-199574, the flat and corrugated foils are joined together only at the opposite ends of the honeycomb body, and they are not joined in the intermediate portion between the honeycomb-body ends. In this structure, the joining between the honeycomb body and jacket is very unstable, and is unsatisfactory from the viewpoint of at least one of the strength of the joining of the honeycomb body to the jacket and the heat and fatigue resistance. Also Japanese Unexamined Utility Model Publication No. 62-160728 discloses a method of mechanically fixing the honeycomb body to the jacket. In this structure, however, which is separate from the jacket, the honeycomb body vibrates inside the jacket so that the catalyst supported thereby is likely to fall out, resulting in a reduced catalytic conversion of the exhaust gases.

Further, Japanese Unexamined Utility Model Publication No. 62-194436 discloses a metallic honeycomb carrier in which the honeycomb body is joined at the outer circumference thereof to the inner face of the jacket only at one cross section of the latter. Also, Japanese Unexamined Patent Publication Nos. 62-273050 and 62-273051 disclose structures in which only the ends of the foils are axially joined to the jacket but the flat and corrugated foils are not joined together, to suppress the thermal stress and thermal fatigue caused by the heat cycle, and further, Japanese Unexamined Patent Publication No. 62-83044 discloses a method of making a honeycomb structure which incurs only a minimum thermal stress by also waving the flat foil at long intervals and forming waves of short intervals in the corrugated foil to give an extra allowance for deformation in the cells of honeycomb body formed at the junctions. These conventional methods, however, cannot provide a structure in which the junctions between the flat and corrugated foils inside the honeycomb body can sufficiently withstand the hot and high speed exhaust gases.

DISCLOSURE OF THE INVENTION

An object of the present invention is to overcome the above-mentioned drawbacks of the conventional techniques by providing a metallic carrier having an heat and fatigue registance by which it can withstand a hot and high speed exhaust gas flow, and further, rapid heating and cooling.

The above-mentioned object is attained by providing a metallic carrier for an automobile exhaust gas-purifying catalyst in which a critical rupture rarely occurs due to thermal fatigue, even when a temperature distribution between the honeycomb and jacket and inside the honeycomb occurs, comprising a metallic honeycomb formed by winding together flat and corrugated metal foils, and a metallic jacket enclosing the honeycomb, wherein the flat and corrugated foils are joined together in a range of from the outermost to the innermost layer in at least one axial end portion of the honeycomb (this portion will be referred to as "end face portion" hereinafter), the flat and corrugated foils being joined together in a range of from the outermost layer to a range of from one turn and less than a quarter of the total number of layers in at least a part of an intermediate portion contiguous to the end face portion (this portion will be referred to as "outer circumferential reinforcing layer" hereinafter), the joining between the corrugated or flat foil at the outermost layer of the honeycomb with the metallic jacket being made in the intermediate portion.

The structure of this joining should be such that the metallic carrier can withstand external forces such as the hot and high speed exhaust gases and engine vibration, as well as the thermal stress imposed on the honeycomb body from the heating and cooling of the exhaust gases.

To minimize the thermal stress developed in the honeycomb body, it is necessary to join the foils to each other and to the jacket so that the thermal stress can be reduced and so that even a partial rupture due to thermal fatigue, if any, will not lead to a critical rupture of the carrier, such as a honeycomb dislocation. As is well known, the higher the number of junctions, the greater the rigidity of the honeycomb, so that the strength is higher but the thermal stress inside the honeycomb body is greater. As shown, for example, in FIG. 18, where the flat and corrugated foils are joined together in the whole area inside the honeycomb body, or where they are wholly joined also to the jacket, a severe temperature variation will cause a large thermal stress inside the honeycomb body, and between the honeycomb and jacket, which in turn will break the foils located near the outer layer of the honeycomb, thus causing the honeycomb to be dislocated after the carrier is used for a short time. To suppress this thermal stress, the flat and corrugated foils should remain free from each other, but it is also evident that such a structure does not permit the carrier to be durable against the external force. Hence, it is necessary to provide a minimum number of junctions between the flat and corrugated foils, with which the carrier can withstand the external force. In the carrier having a structure of a junction shown in FIG. 19, the flat and corrugated foils are joined together in all the layers in a range of from the outermost to the innermost layer in the proximity of the opposite end portions of the honeycomb, and the honeycomb and jacket are joined to each other at the outer circumference of a portion in which the flat and corrugated foils are not joined together, and between the portions W-1 and W-2 a predetermined distance from the inner faces 8-1 and 9-1 of the end face portions. In this structure, the honeycomb is not joined to the jacket at both end face portions where the thermal stress is the greatest, but is joined to the jacket at the outer circumference of a portion 10 where the flat and corrugated foils are not joined together and the thermal stress is relatively small. Namely, this structure appears reasonable from the standpoint of the reduction of thermal stress. In this structure, however, one outermost foil between W-1 and 8-1 and W-2 and 9-1 has to hold the entire honeycomb, so this structure is not mechanically durable, and thus has a short life. An improved structure is shown in FIG. 20, in which the honeycomb and jacket are joined to each other in a zone extended to a part of the outer circumferences of the end face portions. This improved structure has a sufficient mechanical strength and has a considerably longer life against thermal fatigue, but thermal stress occurs in the junction between the end face portions and jacket and causes the junctions to be ruptured, finally resulting in the dislocation of the honeycomb. The thermal stress is caused by the expansion and shrinkage due to the heat inside the carrier and becomes maximum at the outermost layers. When the inside is shrunk the outer layer is subject to a tensile stress. If the flat and corrugated foils are joined together only near the outer layers of the honeycomb body but not inside of the latter in this structure, no large thermal stress will take place in the outer layer even when shrinkage occurs inside.

Accordingly, the present invention provides a carrier structure in which the flat and corrugated foils of the honeycomb body are joined together only near the outer layers of the honeycomb, not inside thereof. If the flat and corrugated foils at the end portion are not joined together in this structure, a flat-foil dislocation called "scoping" occurs due to the exhaust gas flow or the foils scatter as partially bent or cut. Therefore, in at least one of the opposite end portions, the flat and corrugated foils must be joined together in a range of from the outermost to innermost layer to withstand the external force.

Accordingly, the honeycomb body of the metallic carrier according to the present invention has a structure in which the flat and corrugated foils located in a range of from the outermost to innermost layer in at least one of both end portions of the carrier and only near the outer layers in the intermediate portion other than the above range are joined together to form an end face portion and an outer circumferential reinforcing layer. Owing to this structure, the thermal stress developed inside the honeycomb body is minimized and the carrier is capable of withstanding an external force applied thereto.

However, if the foils are joined together in too wide a range near the outer layers of the honeycomb body, a large thermal stress will occur in this junction. To avoid this thermal stress, the junction must be limited. The range should be limited to a one from one outermost turn to a quarter of the total number of layers at maximum as counted from the outermost layer. Namely, the joining range must be appropriately set at the outer layer in a range smaller than the quarter of the total number of layers. As the joining range is increased beyond this range, the thermal stress to the outermost layer of the honeycomb becomes larger and damages the honeycomb body.

Also, the jacket and honeycomb are joined to each other mainly where only the foils in the portion near the outer layer of the honeycomb are joined together, that is, in the portion of the reinforcing layer, not in the range from the outermost to the innermost layer of the honeycomb body, that is, in the end face portions, as much as possible. Accordingly, the thermal stress likely to develop between the jacket and honeycomb body can be minimized while the honeycomb can maintain a sufficient strength against the exhaust gas flow and engine vibration, so that the carrier can show a long life in a severe heat cycle test.

BRIEF DESCRIPTION OF THE DRAWINGS

FIG. 1 is a sectional perspective view of a conventional metallic carrier;

FIG. 2 is an enlarged view of the portion A in FIG. 1;

FIG. 3 is a schematic sectional view of the junctions in the metallic carrier according to the present invention, showing the state in which the flat and corrugated foils at both end portions of the honeycomb are joined together (to form the end face portions) and flat and corrugated foils in a part of the intermediate portion of the honeycomb are joined together (to form the outer circumferential reinforcing layer), and further, to the jacket;

BEST MODE OF CARRYING OUT THE INVENTION

Figure 4:
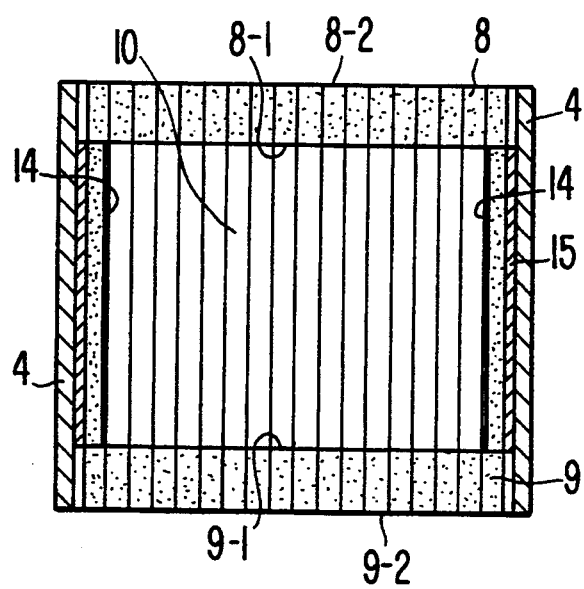
FIGS. 4 and 5 show variations of the embodiment shown in FIG. 3.

The best mode of carrying out the present invention will be described herebelow with reference to the drawings.

First, the structure of the metallic carrier will be explained with reference to FIGS. 1 and 2.

As shown, a metallic carrier 1 is formed by winding into the form of a cylinder or elliptic cylinder flat stainless steel foils 2 and corrugated stainless steel foils 3, both 50 μm or so in thickness, as overlapped, inserting this cylinder or elliptic cylinder to a heat-resistant stainless steel jacket 4 and joining the flat and corrugated foils to each other at 5 and the foils and jacket at 6, by brazing or the like. FIG. 3 is a sectional view showing the junction between the honeycomb and the jacket of the metallic carrier according to the present invention. As shown, the flat and corrugated foils are axially joined together (as indicated at 5) to a depth of 2 mm to 30 mm from each of the opposite end faces 7-1 and 7-2 of the honeycomb, which are also the exhaust gas inlet and outlet, respectively, and in all the layers in a range of from the outermost to the innermost layer of the honeycomb (shown as hatched at 8 and 9 in FIG. 3). Also, the foils are joined together in an intermediate portion 10 between the opposite end face portions 8 and 9 of the honeycomb, in a range of from one layer to a quarter of the total number of layers counted from the outermost layer and axially to a predetermined depth from the inner faces 8-1 and 9-1 of the opposite end face portions, for example, to a depth of 10 to 50% of the total length of the carrier, thereby forming outer circumferential reinforcing layers 11 and 12. Further, the outermost circumferences of the outer circumferential reinforcing layers 11 and 12 are joined to the inner face of the jacket 4. In the example junction shown in FIG. 3, the outer circumferences of the opposite end face portions 8 and 9 are not joined to the inner face of the jacket 4 but joined beyond the axial depth of the outer circumferential reinforcing layers 11 and 12 as indicated at 13-1 and 13-2, respectively. It is possible to design optimum joining structures for the operating conditions of the carrier, including the size and shape, exhaust gas temperature, location of installation, cone shape, main operating pattern, etc., without departing from the scope of the present invention. Namely, the present invention permits the joining together of the flat and corrugated foils laid in a range of from the outermost to innermost layer at both or either end portions of the exhaust gas inlet and outlet. Normally, in this case, the flat and corrugated foils are joined together at both end portions of the honeycomb, but an abrupt temperature distribution develops especially in the proximity of the outer layers of the honeycomb, and to suppress the axial thermal stress when the temperature at these end portions exceeds 860° C., the flat and corrugated foils are desirably joined at only one of the end portions. Also, the flat and corrugated foils may be joined together in the end face portions to nearly the same depth in a range of from the innermost to outermost layer, but at the connection between the end face portions and outer circumferential reinforcing layer, the joining depth is desirably shorter in the central portion where the axial tensile stress is small and continuously increases toward the outside where the axial tensile stress is large (see FIGS. 14 and 15). This structure requires a special manufacturing equipment. Namely, when the joining is made by brazing, a binder solution for the adhesion of a brazing filler material is applied to a predetermined area on the corrugated foil by a special roller while winding a carrier. For this brazing, the carrier must be wound while sliding the application roller axially thereof, so that, at the surface of the corrugated foil, the area to which the binder solution is applied is increased from the inner to the outer layer. After the flat and corrugated foils are wound on each other, the brazing filler material is applied and the brazing filler material is deposited in place, they are subject to a heat treatment in vacuum to provide an intended junction structure. The outer circumferential reinforcing layers including the flat and corrugated foils in a range of from the outermost layer to a smaller number of layers than a quarter of the total number of layers may be extended along the entire length, or along only a part of the intermediate portion between the end face portions. Also in this case, the junctions, number of layers and joining length should be selected according to the dimensions of an intended carrier, joined portions of the upper and lower cones, etc. The honeycomb body and jacket are desirably joined to each other normally at other than the end face portions where the radial thermal stress is large, but since the carrier is installed in the proximity of the engine and receives axial vibration from the engine, the joining with the jacket must be made with a high joining strength. In this case, the honeycomb is joined to the jacket in a range including a part of the end face portion, at some sacrifice of the anti-thermal fatigue property (see FIGS. 16 and 17). However, since the radial thermal stress of a carrier having so large a diameter that the number of layers exceeds 50 is particularly large, it is desirable to adopt this method of joining.

The joining referred to herein is effected by a brazing, resistance welding, laser welding, electron beam welding, arc welding, etc.

Also, in the present invention, the corrugation of the corrugated foils may be in the form of a sinusoidal wave, trapezoid, rectangle or the like. Moreover, the shape of the section perpendicular to the axial direction of the metallic carrier according to the present invention may be other than circular, for example, an elliptical, race-track shape.

Figure 5:
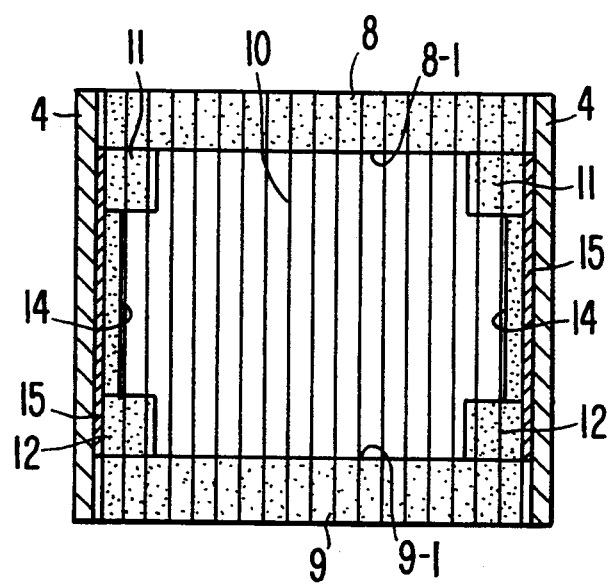
Figure 6:
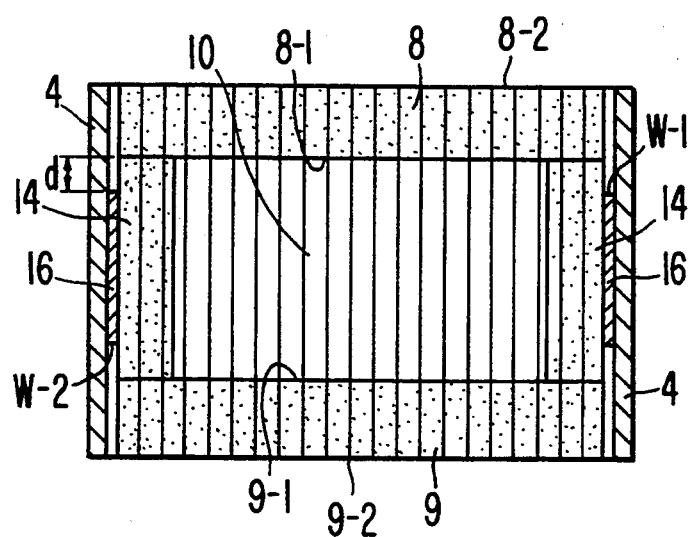
FIG. 6 shows another junction between the side face of the honeycomb and the metallic jacket than shown in FIG. 4.

FIGS. 4 to 6 show variations, respectively, of the embodiment shown in FIG. 3. FIG. 4 shows that the outer circumferential reinforcing layer 14 is formed along the total length of the intermediate portion in contact with the inner faces 8-1 and 9-1 of the opposite end face portions 8 and 9, respectively and the entire outer circumference of the outer circumferential reinforcing layer is joined at 15 to the inner face of the jacket.

FIG. 5 shows a combination of the structures shown in FIGS. 3 and 4, in which the outer circumferential reinforcing layers 11 and 12 contiguous to the opposite end face portions 8 and 9 are formed in a larger number of turns than in the other outer circumferential reinforcing layer 14.

FIG. 6 is another variation of the embodiment shown in FIG. 4, in which the outer circumference of the outer circumferential reinforcing layer 14 is joined at 16 to the inner face of the jacket, the joining beginning with a position W separate from the inner faces 8-1 and 9-1 of the opposite end face portions 8 and 9, respectively.

Such spacing (d) permits an effectively suppression of the thermal stress likely to develop in the junction between the outer circumferential reinforcing layer 14 and the opposite end face portions 8 and 9, respectively. The spacing d may be appropriately selected according to the material, structure and size of the carrier, taking into consideration the radial shrinkage of the honeycomb body especially.

Figure 7:
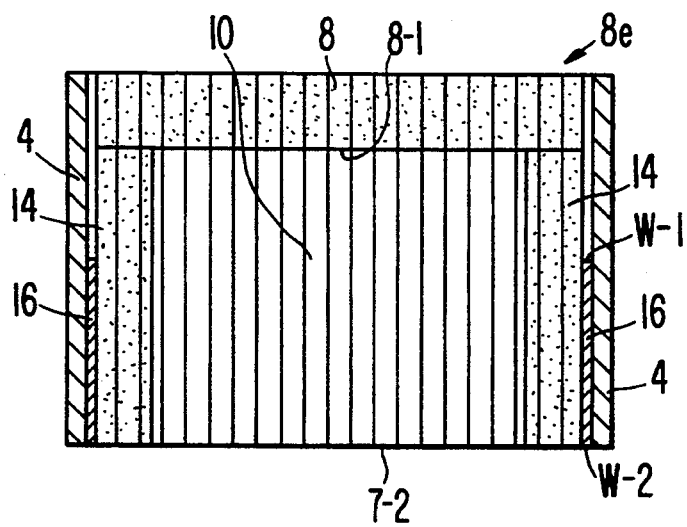
FIG. 7 is a sectional view of another embodiment of the metallic carrier according to the present invention, showing the junction where the flat and corrugated foils at one end of the honeycomb are joined together and flat and corrugated foils in a part of the intermediate portion of the honeycomb are joined together, and further, to the jacket.

FIG. 7 shows the end face portion of the honeycomb body formed only at one side 8. Namely, the outer circumferential reinforcing layer 14 is placed in contact at the upper end thereof with the inner face 8-1 of the end face portion 8 and the lower end thereof extended to the end face 7 of the honeycomb body. According to this embodiment, the junction 16 between the outer circumferential reinforcing layer 14 and the jacket 4 is laid at the opposite side of the end face portion 8 so as to be as far from the end face portion 8 as possible. The honeycomb having only one end face portion, this embodiment does not have any symmetry as in the embodiment in which the honeycomb body has opposite end face portions, but the honeycomb is flexible enough to accommodate the heat cycle in which heating and cooling is cyclic and can have a further flexible structure if the above-mentioned spacing d is large as mentioned above.

Figure 8:
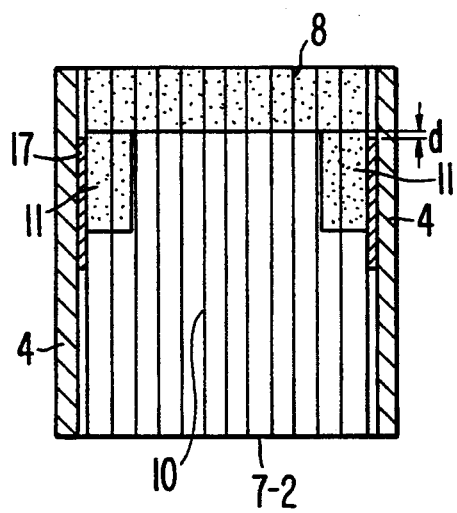
FIGS. 8, 9, 10 and 11 show variations of the embodiment shown in FIG. 7.

FIGS. 8 to 11 show variations, respectively, of the embodiment shown in FIG. 7. FIG. 8 shows a structure in which the outer circumferential reinforcing layer 11 contiguous to one end face portion 8 has a predetermined length along the axial direction of the honeycomb body. The junction 17 with the inner face of the jacket is separated from the inner face 8-1 of the end face portion 8 over a larger length of the outer circumferential reinforcing layer 11.

Figure 9:
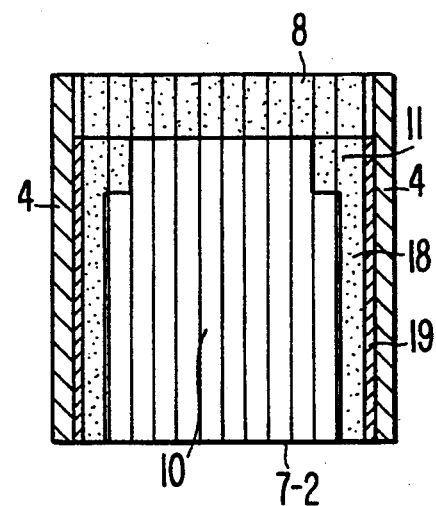
Figure 10:
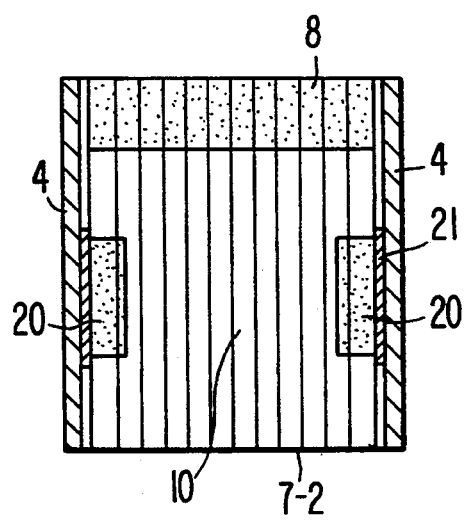
Figure 11:
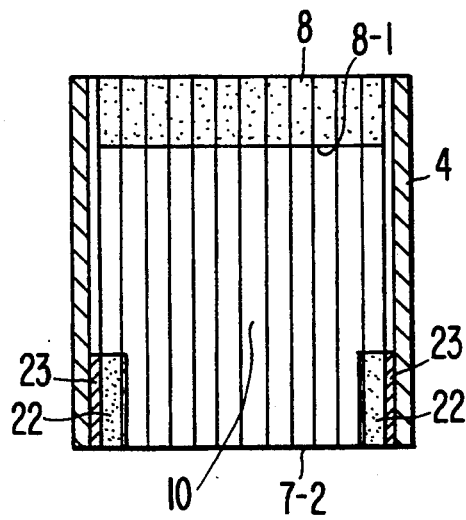

FIG. 9 shows a structure in which an outer circumferential reinforcing layer 18 contiguous to the outer circumferential reinforcing layer 11 in FIG. 8 and thinner than the layer 11 is formed as extending to the other end face 7-2 of the honeycomb, the junction with the inner face of the jacket being laid on the outer circumferences, respectively, of the outer circumferential reinforcing layers 11 and 18. FIG. 10 shows an outer circumferential reinforcing layer 20 separated from both the inner face 8-1 of the end face portion 8 and the end face 7-2 of the honeycomb. FIG. 11 shows another outer circumferential reinforcing layer 22 largely spaced from the inner face of the end face portion 8 and extending to the other end face 7-2 of the honeycomb body. As shown in FIG. 10, the junction 21 with the inner face of the jacket is longer than the upper and lower ends of the outer circumferential reinforcing layer 20. As seen from FIG. 11, the junction 23 with the inner face of the jacket is nearly the same in length as the outer circumference of the outer circumferential reinforcing layer 22.

Figure 12:
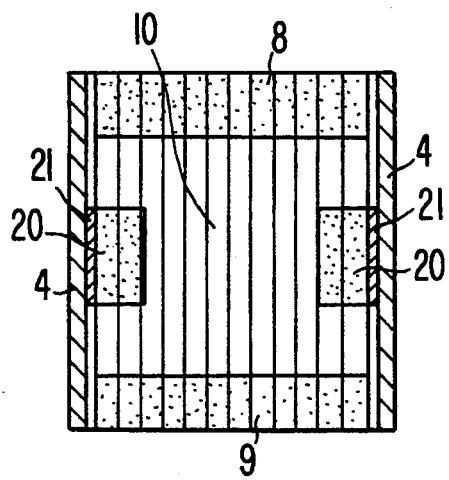
FIGS. 12 and 13 show variations of the embodiment shown in FIG. 3.
Figure 13:
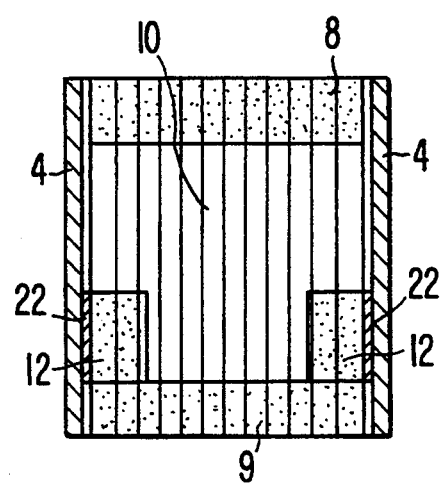

FIG. 12 shows a variation of the embodiment of the present invention, in which another end face portion 9 is provided on the end face 7-2 of the honeycomb body shown in FIG. 10. FIG. 13 shows a structure in which the outer circumferential reinforcing layer 11 in FIG. 3 is omitted. In both these embodiments, the joining with the inner face of the jacket is made over nearly the same length as the outer circumference of the outer circumferential reinforcing layers 20 and 12.

Figure 14:
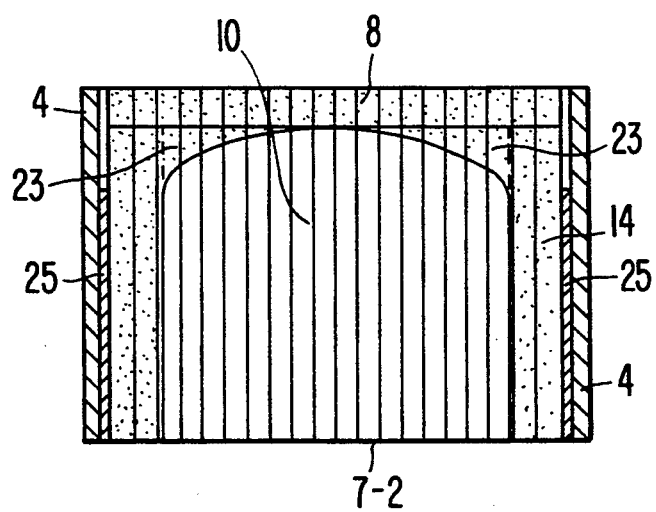
FIG. 14 is another variation of the embodiment shown in FIG. 7.
Figure 15:
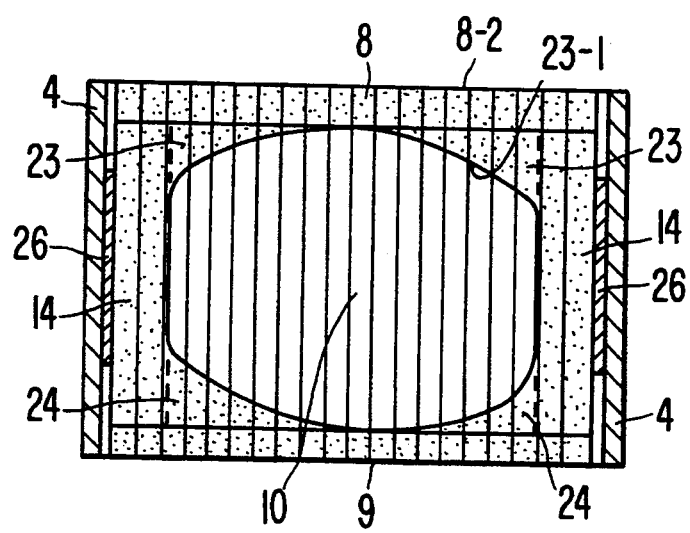
FIG. 15 is a further variation of the embodiment shown in FIG. 4.

FIG. 14 shows an improved connection between the axial end face portion 8 and outer circumferential reinforcing layer 14. The connection is formed in gradually deeper positions from the center face toward the outer circumference of the axial end portion 8, thereby forming corner junctions 23 which are in contact with the circumferential reinforcing layer 14 at the deepest position. Further, FIG. 15 shows an example structure in which the honeycomb body with opposite end face portions 8 and 9 have the corner junctions 23 and 24. The structure is similar in detail to those shown in FIG. 14.

As the joining depth of the corner junctions between the end face portion and outer circumferential reinforcing layer is continuously increased from the center toward the outer circumference of the end face portion, the stress will not be concentrated at the corner junctions and the strength of the honeycomb can be maintained at a high level. It should be noted that the linear cornering of the junctions has the same effect as the curved cornering.

In any of the above-mentioned embodiments, the outer face of the honeycomb and the inner face of the metallic jacket are joined to each other within a range not beyond the position of the inner face of the axial end face portion. In some cases, however, an emphasis is placed on the resistance to high temperature rather than the anti-thermal fatigue property according to the operating conditions of the carrier according to the present invention. In such a case, the metallic jacket and the honeycomb body are joined to each other in a part of the axial end face portion as well as in the outer circumferential reinforcing layer.

Figure 16:
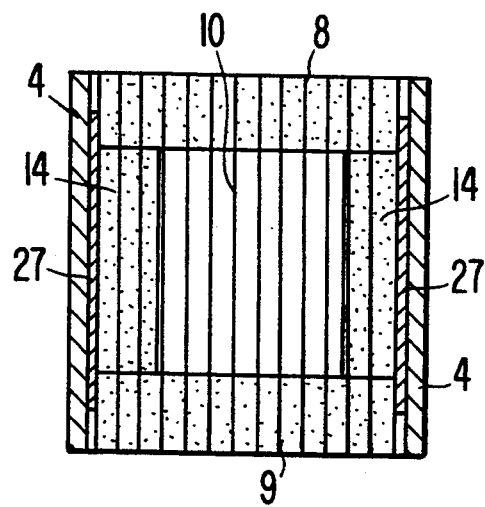
FIG. 16 is a still further variation of the embodiment shown in FIG. 4, showing another junction between the honeycomb side face and metallic jacket.
Figure 17:
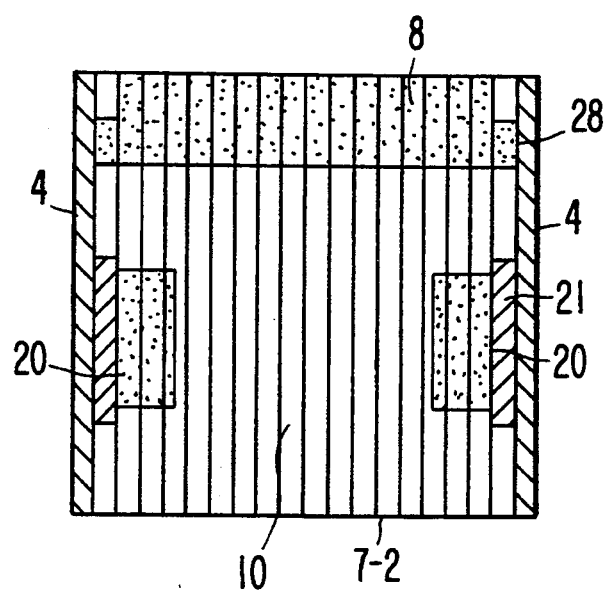
FIG. 17 is a yet further variation of the embodiment shown in FIG. 16.

One example of the above-mentioned metallic carrier is shown in FIG. 16. As apparent from FIG. 16, the outermost circumference of the honeycomb body and the inner face of the jacket are joined to each other at the entire outermost circumference of the outer circumferential reinforcing layer 14 and at a part of each of the outer circumferences of the opposite end face portions 8 and 9. Also, the other outer circumferential reinforcing layer in which such a construction can be suitably adopted is optimally used in the honeycomb structures shown especially in FIGS. 4, 10 and 12. A variation of the embodiment shown in FIG. 16 is shown in FIG. 17. In this embodiment shown in FIG. 17, the outer circumferential reinforcing layer 20 is joined at 21 and also a part of the outer circumference of the end face portion 8 and the inner face of the jacket 4 are joined to each other at 28.

Note that even in such a small carrier, in view of the thermal stress, the entire outer circumference of the end face portion must not be joined.

EMBODIMENTS

Embodiment 1

One embodiment of the present invention is shown in FIG. 3 which is a schematic axial-sectional view of the junction of the metallic carrier 1 composed of a stainless steel jacket 100 mm in inside diameter, 1.5 mm in thickness, and 100 mm in length, and a honeycomb formed by 36 turns of flat and corrugated 20Cr-5Al stainless steel foils 50 μm in thickness. In the opposite end face portions 8 and 9 of the honeycomb, the flat and corrugated foils are brazed to each other to a depth of 10 mm from the end faces 8-2 and 9-2, but the face of this portion corresponding to the stainless steel jacket 4 is not brazed. In parts 11 and 12 of the honeycomb intermediate portion contiguous to the end face portions 8 and 9, the flat and corrugated foils in a range from the outermost layer to the ninth layer of the foils are brazed together to a depth of 10 mm from the inner faces 8-1 and 9-1 of the end face portions 8 and 9, thus forming an outer circumferential reinforcing layer, and the outer circumference is brazed at 13 and 13-1 to the jacket 4 as well. Also in this embodiment, the axial intermediate portion 10 of the honeycomb, which is contiguous to the outer circumferential reinforcing layer, is brazed only at a part of the outer circumference to the inner face of the jacket 4, while the rest 10 is not brazed at all.

Figure 18:
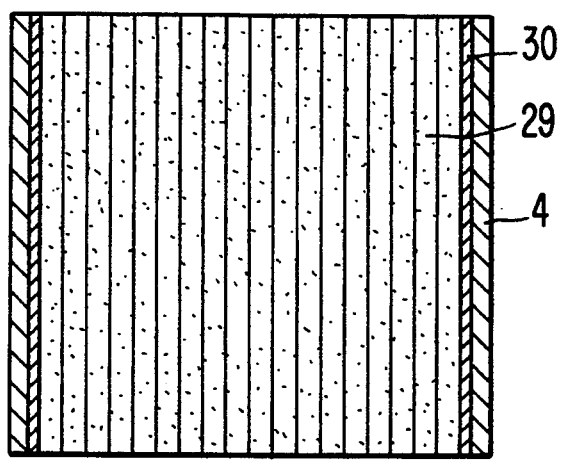
FIGS. 18, 19, 20 and 21 are sectional views, respectively, of the junction in the conventional metallic carrier, showing an example carrier structure in comparison with the present invention.

FIG. 18 shows a comparison example structure. This is a metallic carrier of a same size as that shown in FIG. 3. In this carrier, the corrugated and flat foils are wholly brazed together in the honeycomb inside 29, and the outer circumference is entirely brazed at 30 to the jacket 4.

A gamma-alumina powder carrying Pt catalyst was deposited as baked on these two kinds of metallic carriers and were subjected to a bench test with each installed in the exhaust system of an engine of 2,000 cc in piston displacement. In this bench test, each of these carriers was left at a temperature higher than 800° C. for 1 min and at a temperature lower than 150° C. in a heat cycle during which it was heated and cooled. The heat cycle (15 min for one cycle in total) was repeated. The test results proved the following. After the heat cycle was repeated 80 times, the honeycomb structure in any of the first to third layers counted from the outermost layer of the honeycomb was found broken along the entire circumference thereof and the inner honeycomb structure was found dislocated about 20 mm down the exhaust gas flow. On the contrary, the honeycomb in the carrier according to the present invention (in FIG. 3) showed no abnormality even after the completion of 1,000 heat cycles.

Embodiment 2

FIG. 4 shows the axial sectional view of another embodiment of the present invention. This metallic carrier has the same material and dimensions as that shown in FIG. 3. The reference numerals 8 and 9 indicate the end face portions (10 mm in diameter by 15 mm in length) in which the flat and corrugated foils in all the honeycomb layers are joined together by resistance welding to a depth of 15 mm from the end faces 7-1 and 7-2 at the stage where the foils are wound. The foils are not joined to the jacket 4. The reference numeral 14 indicates an outer circumferential reinforcing layer in which the flat and corrugated foils are joined together by resistance welding along the total length of the intermediate portion contiguous to the inner faces 8-1 and 9-1 of the end face portions 8 and 9, respectively, in a range from the outermost layer to the third layer. The outer circumference of the outer circumferential reinforcing layer 14 is brazed at 15 in the entire zone up to the jacket 4. The reference numeral 10 indicates a honeycomb portion not joined.

The carrier according to this embodiment was repeatedly subjected to a heat cycle test on the engine bench under the same conditions as those for the embodiment 1. However, no structural abnormality was found in this carrier even after the heat cycle was repeated 1,000 times.

Embodiment 3

FIG. 5 is an axial-sectional view of a still another embodiment of the present invention, being a metallic carrier having the same material and dimensions as that shown in FIG. 3. The reference numerals 8 and 9 indicate the end face portions (100 mm in diameter by 20 mm in length), respectively, in which all the layers in the honeycomb are welded together by laser welding at the stage where the foils are wound. In these end face portions, the honeycomb is not joined to the stainless steel jacket 4. The reference numerals 11 and 12 indicate outer circumferential reinforcing layers (77 to 100 mm in diameter by 10 mm in length), respectively, in which the foils in a range from the outermost layer to the ninth layer are joined together by laser welding to a depth of 10 mm from the inner faces of the end face portions 8 and 9 in a part of the intermediate portion contiguous to these portions, and the reference numeral 14 indicates an outer circumferential reinforcing layer (95 to 100 mm in diameter by 40 mm in length) in which the foils in a range from the outermost layer to the second layer are joined together by laser welding along the total length of the intermediate portion continuous to the outer circumferential reinforcing layers 11 and 12. The outer circumference faces of the above-mentioned outer circumferential layers 11, 12 and 14 and the inner face of the jacket are brazed to each other at 15. The reference numeral 10 indicates a honeycomb portion in which the foils are not joined together.

The above-mentioned carrier was repeatedly subjected to a heat cycle test on the engine bench under the same conditions as those for the embodiment 1, but no structural abnormality was found in the carrier even after the heat cycle was repeated 1,000 times.

Embodiment 4

FIG. 6 is a longitudinal-sectional view of a yet another embodiment of the metallic carrier according to the present invention. This metallic carrier is composed of a honeycomb structure (137 mm in outside diameter) having 50 turns in total formed by winding together flat and corrugated foils made of 50 μm-thick, heat and oxidation resistant ferrite stainless steel (containing Cr in 24 wt %, Al in 4.5 wt %, Ce and REM in 0.09 wt % and Fe as rest), and a stainless steel (SUS430) jacket 140 mm in outside diameter, 1.5 mm in thickness, and 100 mm in length. The reference numerals 8 and 9 indicate the end face portions, respectively, in which the flat and corrugated foils are joined together by brazing to a depth of 20 mm from the end face. The reference numeral 14 indicates an outer circumferential reinforcing layer in which the foils are joined together along the total length of an axial intermediate portion in a range from the outermost layer to the fifth layer. The outer circumference of the outer circumferential reinforcing layer 14 and the inner face of the jacket 4 are joined to each other at 16 by brazing along a length of 50 mm. In this embodiment, the foils are joined together as axially spaced 5 mm from each other in a range from the inner faces 8-1 and 9-1 of the end face portions 8 and 9, respectively, to the end faces W-1 and W-2 of the brazing 16. The reference numeral 10 indicates a portion inside the carrier where the foils are not joined together.

The metallic carrier mentioned above was repeatedly subjected to a heat cycle test (in which the test piece was kept at a temperature higher than 800° C. for 1 min and at a temperature lower than 100° C. for 1 min; heating and cooling are done in one cycle of 15 min in total) on the engine bench under the same conditions as those for the embodiment 1. The test results showed no abnormality in the carrier even after the heat cycle was repeated 1,000 times and proved that this metallic carrier was capable of withstanding the thermal stress and thermal fatigue and the vibration of the engine or the like.

Figure 19:
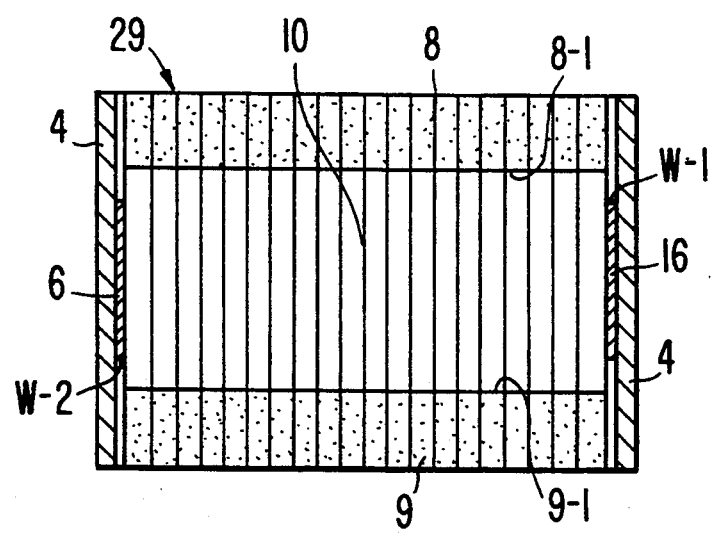

FIG. 19 shows a comparative example of a carrier having the same size as the embodiment 4 (in FIG. 6) and in which the outer circumferential reinforcing layer 14 is not formed between the end face portions 8 and 9.

It was found after the same heat cycle test as for the embodiment 4 that the flat foils at the outer circumference of the honeycomb 10 in which the foils were not joined together were broken in the zone between the inner faces 8-1 and 9-1 of the end face portions 8 and 9, respectively, and the end faces W-1 and W-2 and that the honeycomb body was dislocated 30 mm from the jacket 4 down the exhaust gas flow.

Figure 20:
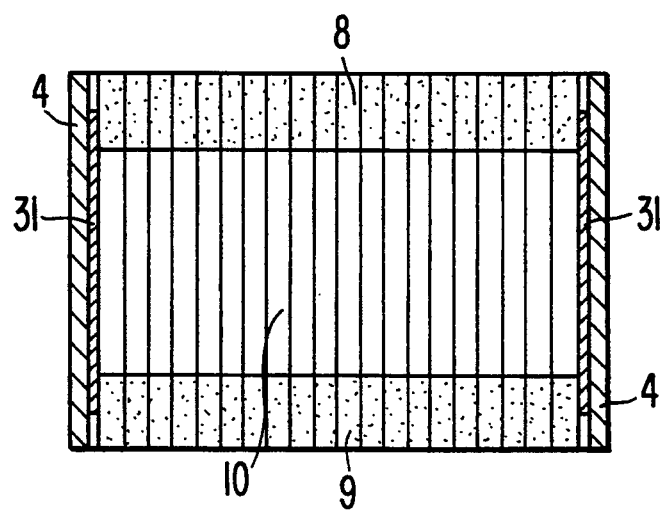

FIG. 20 also shows a comparative example of a carrier having a joining portion 31, in which the length of a junction between the honeycomb and jacket is selected to be 80 mm in the metallic carrier and each end is extended 5 mm in the direction toward the end face from the inner faces 8-1 and 9-1 of the end face portions 8 and 9, respectively, as in comparison with the structure shown in FIG. 19.

This carrier was repeatedly subjected to the same heat cycle test as for the embodiment 4. After the test was repeated for 360 cycles, the brazing, between the flat and corrugated foils at the outermost layer of the honeycomb in the portion extending beyond the end face from the inner faces 8-1 and 9-1 where the foils were joined together, was found to be broken, and also the corrugated foils at the outermost layer of the intermediate portion of the honeycomb were found to be broken. Moreover, the honeycomb body was found dislocated about 30 mm down stream of the exhaust gas flow from the jacket 4.

Figure 21:
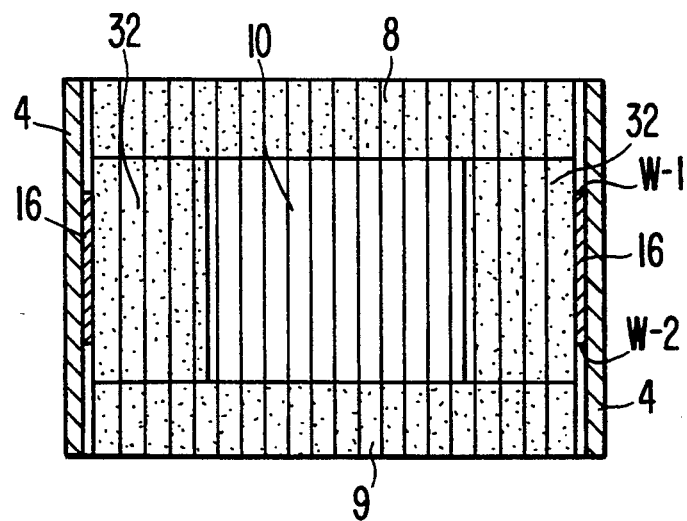

FIG. 21 shows a comparison example carrier having the same size as in the embodiment 4 (in FIG. 6), in which the foils included in a range from the outermost layer of the honeycomb to the twentieth turn which includes more than a quarter of the total number of turns are brazed together, thereby forming an outer circumferential reinforcing layer 32.

The carrier was repeatedly subjected to the same heat cycle test as for the embodiment 4. After the heat cycle was repeated 480 times, the junction between the flat and corrugated foils at the outermost layer and the corrugated foils at the outermost layer were found to be broken, and the honeycomb body was also found dislocated about 25 mm downstream of the exhaust gas flow from the jacket 4. Namely, it was proved that when a number of turns in which the foils were joined together in the intermediate portion of the honeycomb, exceeds a quarter of the total number of turns, the junction near the outer layers had a higher rigidity so that the thermal stress was increased along the outermost layer, finally resulting in breakage of the junction.

Embodiment 5

FIG. 7 is a longitudinal sectional view of a still another embodiment of the metallic carrier according to the present invention. In this embodiment, the honeycomb body has the axial end face portion formed at only one end thereof. The metallic carrier is 75 mm in diameter and 110 mm in length. The turns of the honeycomb body count 29 in number, and the outer circumferential reinforcing later is composed of two turns counted from the outermost layer and has a length equal to the total length of the intermediate portion. The lower end of the outer circumferential reinforcing layer 14 is in contact with the end face 7-2 of the honeycomb body, and the outer circumference of the outer circumferential reinforcing layer 14 and the inner face of the jacket 4 are so joined at the opposite side of the end face portion 8 that the end face W-2 takes a position where it is in contact with the end face 7-2 of the honeycomb. Hence, the spacing between the inner face 8-1 of the end face portion 8 and the end face W-1 of the juncture 16 is 30 mm.

The metallic carrier thus constructed was repeatedly subjected to the same heat cycle test as for the embodiment 4. Even after the heat cycle was repeated 1,000 times, no abnormality was found in this carrier. A metallic carrier having a same size was made having the same structure as shown in FIG. 20 and subjected to a same heat cycle test. When the test was repeated for 85 cycles, a honeycomb dislocation took place. In a metallic carrier of such size and having the conventional structure, since the thermal stress in the axial direction of the honeycomb, especially in the proximity of the outer layer is so large that the honeycomb structure is likely to be ruptured. This test proved that the metallic carrier according to the present invention had a high resistance to thermal stress.

Embodiment 6

FIG. 11 shows the junction of a further embodiment of the present invention. In this embodiment, the upper end of the outer circumferential reinforcing layer 14 in the embodiment 5 is considerably separated from the inner face 8-1 of the end face portion 8. This carrier has the same size as the one according to the embodiment 4 while the upper end of the outer circumferential reinforcing layer 22 is formed as separated 60 mm from the inner face 8-1 of the end face portion. Therefore, the outer circumferential reinforcing layer is 20 mm long, and the length of joining with the jacket 4 is also 20 mm.

The above-mentioned carrier was heated up to 800° C. using a gas burner and cooled by air down to 100° C. Even after this heat cycle was repeated 500 times, honeycomb rupture, disjoining and honeycomb distortion were not found. A metallic carrier of a same size was built having a structure shown in FIG. 18 and subjected to a similar heat cycle test. When the test was repeated for 300 cycles, many bucklings and gaps in the honeycomb and honeycomb breakage were found.

Embodiment 7

FIG. 15 shows a yet further embodiment of the present invention. In this embodiment, the end face portion and the outer circumferential reinforcing layer are joined in the form of curved corner juncture. The carrier has a same size as the one according to the embodiment 4, but the axial joining depth of the foils in the end face portions 8 and 9 is 10 mm, respectively. The corner junctions 23 and 24 are so constructed that the joining depth from the center of the end face portion is increased little by little to the sixth turn counted from the outermost layer and that the joining depth at the sixth turn is 30 mm. The foils in a range from the outermost layer to the fifth turn are joined together along the total length thereof to form an outer circumferential reinforcing layer 14. The outer circumference of the outer circumferential reinforcing layer 14 and the jacket 4 are joined along a length of 40 mm. The end face portions are not joined at the lateral sides thereof to the jacket.

The above-mentioned carrier was repeatedly subjected to the same heat cycle test as for the embodiment 4. Even after the test was repeated for 1,500 cycles, no abnormality was found in the carrier. This increased life of the carrier is due to the reduced concentration of stress at the juncture between the end face portions and outer circumferential reinforcing layer.

Embodiment 8

FIG. 16 shows a yet still further embodiment of the present invention. The metallic carrier according to this embodiment is of 63 mm in diameter, 100 mm in length and has a total number of 24 turns. The length of joining between the outer circumference of the honeycomb and the inner face of the jacket is 80 mm including the joining length of 20 mm of the outer circumference of the end face portions 8 and 9. The outer circumferential reinforcing layer is provided in one turn, extending along the total length of the intermediate portion.

The carrier thus constructed was installed in the exhaust manifold and subjected to the same heat cycle test as for the embodiment 4. Even after the test was repeated for 1,000 cycles, no abnormality was found.

When the carrier is equipped inside the exhaust manifold, the temperature distribution is small, so that the radial thermal stress is relatively small. Therefore, it is essential that the carrier be capable of withstanding an external force such as the engine vibration and exhaust gas pressure. In the above-mentioned carrier, the area of joining between the honeycomb and jacket is increased to prevent the junctions from being ruptured by such external forces.

INDUSTRIAL EXPLOITABILITY

Having the above-mentioned construction, the metallic carrier for catalyst for catalytic conversion according to the present invention has a sufficient heat and fatigue registant property and strength even if repeatedly subjected to a severe heat cycle for a long time when installed in the exhaust system of an automotive engine. The metallic carrier is easy to manufacture and uses only a small amount of brazing filler material. Namely, it can be manufactured at a low cost.

We claim:

1. A metallic carrier for a catalyst for a catalytic converter, comprising:
   a metallic honeycomb body constituted by a flat metal foil and a corrugated metal foil which have been stacked and wound together in layers, each layer constituted by a flat metal foil and a corrugated metal foil, said layers together forming the honeycomb body, and said honeycomb body having a metal foil of an outermost layer constituting an outer circumferential surface of said honeycomb body, and a metallic jacket enclosing said honeycomb body, wherein said layers of the flat and corrugated foils in at least one axial end portion of said honeycomb body are joined together, and the foils in said layers are also joined together in said at least one axial end portion, in a range of from an outermost to an innermost layer to form an end face portion, said at least one axial end portion extending along an axial length of said honeycomb body less than the full axial length of said honeycomb body, said honeycomb body having a remainder of the axial length constituting an axial intermediate portion contiguous to said end face portion, said foils in said layers and said layers in at least a part of an axial length of said axial intermediate portion of said honeycomb body being joined together only in a range of from said outermost layer to a number of layers less than a quarter of the total number of layers in said honeycomb body inwardly thereof from the outermost layer of said honeycomb body to form an outer circumferential reinforcing layer portion, said foil constituting the outer circumferential surface of said honeycomb body and an inner surface of said metallic jacket being joined directly to each other along at least a part of an axial length of said outer circumferential reinforcing layer portion and at most along the entire axial length of said outer circumferential reinforcing layer portion and only a part of an axial length of said at least one axial end portion.

2. A metallic carrier as claimed in claim 1 wherein said outer circumferential surface of said honeycomb body and said inner surface of said metallic jacket are joined to each other along only a location other than the outermost layer of said end face portion.

3. A metallic carrier as claimed in claim 1 wherein said outer circumferential surface of said honeycomb body and said inner surface of said metallic jacket are joined to each other along at least a part of an axial length of the outermost layer of said outer circumferential reinforcing layer portion and along only a part of an axial length of the outermost layer of said end face portion.

4. A metallic carrier as claimed in claim 2 or 3 wherein said flat and corrugated metal foils are joined at each of opposite end portions of said honeycomb body to form end face portions at said opposite end portions of said honeycomb body, and said outer circumferential reinforcing layer portion in the axial intermediate portion of said honeycomb body is contiguous to said end face portions at opposite end portions of said honeycomb body.

5. A metallic carrier as claimed in claim 4 wherein the length in an axial direction of said honeycomb body of said end face portions along which said flat and corrugated metal foils are joined increases toward said axial intermediate portion gradually from a center of said honeycomb body to an innermost circumference of said outer circumferential reinforcing layer portion.

6. A metallic carrier as claimed in claim 2 or 3 wherein said flat and corrugated metal foils are joined at each of opposite end portions of said honeycomb body to form end face portions at said opposite end portions of said honeycomb body, and said outer circumferential reinforcing layer portion extends along the axial length of said axial intermediate portion of said honeycomb body from one end face portion to another end face portion.

7. A metallic carrier as claimed in claim 6 wherein the length in an axial direction of said carrier of each of said end face portions along which said flat and corrugated metal foils are joined increases toward said axial intermediate portion gradually from a center of said honeycomb body to an innermost circumference of said outer circumferential reinforcing layer portion.

8. A metallic carrier as claimed in claim 6 wherein the outer circumferential reinforcing layer portion is composed of two outer circumferential reinforcing layer portion parts respectively contiguous to said opposite end face portions and a further outer circumferential reinforcing layer portion part contiguous to both said two out circumferential reinforcing layer portions and having a smaller number of layers than the each of said two outer circumferential reinforcing layer portion parts.

9. A metallic carrier as claimed in claim 2 or 3 wherein said flat and corrugated metal foils are joined at each of opposite end portions of said honeycomb body to form end face portions at said opposite end portions of said honeycomb body, and said outer circumferential reinforcing layer portion is spaced from said end face portions.

10. A metallic carrier as claimed in claim 2 or 3 wherein said flat and corrugated metal foils are joined at each of opposite end portions of said honeycomb body to form end face portions at said opposite end portions of said honeycomb body, and said outer circumferential reinforcing layer portion is spaced from one of said end face portions and contiguous to the other end face portion.

11. A metallic carrier as claimed in claim 2 or 3 wherein said flat and corrugated metal foils are joined at only one end portion of said honeycomb body to form an end face portion at the one end portion of said honeycomb body, and said outer circumferential reinforcing layer portion in the axial intermediate portion of said honeycomb body is contiguous to said end face portion at said one end portion of said honeycomb body.

12. A metallic carrier as claimed in claim 11 wherein the said end face portion has a length in an axial direction of said honeycomb body along which said flat and corrugated layers are joined which increases toward said axial intermediate portion gradually from a center of said honeycomb body to an innermost circumference of said outer circumferential reinforcing layer.

13. A metallic carrier as claimed in claim 11 wherein said outer circumferential reinforcing layer portion extends along said axial intermediate portion of said honeycomb body from said end face portion at said one end portions of said honeycomb body to the opposite end portion of said honeycomb body.

14. A metallic carrier as claimed in claim 13 wherein the said end face portion has a length in an axial direction of said honeycomb body along which said flat and corrugated metal foils are joined which increases toward said axial intermediate portion gradually from a center of said honeycomb body to an innermost circumference of said outer circumferential reinforcing layer portion.

15. A metallic carrier as claimed in claim 13 wherein the outer circumferential reinforcing layer portion is composed of a first outer circumferential reinforcing layer portion part having one end contiguous to said one end face portion and a second outer circumferential reinforcing layer portion part contiguous to another end of said first outer circumferential reinforcing layer portion and having a smaller number of layers the number of layers of said first outer circumferential reinforcing layer portion part.

16. A metallic carrier as claimed in claim 11 wherein the outer circumferential reinforcing layer portion is composed of a first outer circumferential reinforcing layer portion part contiguous to said one end face portion and a second outer circumferential reinforcing layer portion part having a smaller number of layers than the number of layers of said first outer circumferential reinforcing layer portion part.

17. A metal carrier as claimed in claim 2 or 3 wherein said flat and corrugated metal foils are joined at only one end portion of said honeycomb body to form an end face portion at the one end portion of said honeycomb body, and said outer circumferential reinforcing layer portion is spaced from said one end face portion.

18. A metallic carrier as claimed in claim 17 wherein said outer circumferential reinforcing layer portion is spaced from said one end face portion and contiguous to the other end portion of said honeycomb body.

19. A metallic carrier as claimed in claim 1 wherein said honeycomb body and said inner surface of said metallic jacket are joined to each other in only a part of the outer circumference of said outer circumferential reinforcing layer portion and in a part of the outermost layer of said end face portion.

* * * * *